US008037295B2

(12) United States Patent
Lin (10) Patent No.: US 8,037,295 B2
(45) Date of Patent: Oct. 11, 2011

(54) HARDWARE-BONDED CREDENTIAL MANAGER METHOD AND SYSTEM

(75) Inventor: Paul Lin, Fremont, CA (US)

(73) Assignee: Authenex, Inc., San Jose, CA (US)

( * ) Notice: Subject to any disclaimer, the term of this patent is extended or adjusted under 35 U.S.C. 154(b) by 846 days.

(21) Appl. No.: 12/103,654

(22) Filed: Apr. 15, 2008

(65) Prior Publication Data

US 2009/0259838 A1 Oct. 15, 2009

(51) Int. Cl.
*H04L 29/06* (2006.01)

(52) U.S. Cl. ......... 713/150; 713/151; 713/152; 713/166

(58) Field of Classification Search ................ 713/150, 713/151, 152, 166, 167; 726/18, 22, 35; 380/247

See application file for complete search history.

(56) References Cited

U.S. PATENT DOCUMENTS

| | | | | |
|---|---|---|---|---|
| 5,778,071 A * | 7/1998 | Caputo et al. | ............ | 713/159 |
| 6,236,728 B1 * | 5/2001 | Marchant | ............ | 380/28 |
| 6,553,104 B1 * | 4/2003 | Haefliger | ............ | 379/93.13 |
| 6,834,351 B1 * | 12/2004 | Kabenjian | ............ | 726/9 |
| 7,191,344 B2 * | 3/2007 | Lin et al. | ............ | 713/193 |
| 7,231,526 B2 * | 6/2007 | Hon et al. | ............ | 713/185 |
| 7,334,255 B2 * | 2/2008 | Lin et al. | ............ | 726/2 |
| 7,430,665 B2 * | 9/2008 | DiSanto et al. | ............ | 713/171 |
| 7,475,248 B2 * | 1/2009 | Barrus et al. | ............ | 713/170 |
| 7,890,993 B2 * | 2/2011 | Qin et al. | ............ | 726/5 |
| 2007/0209064 A1 * | 9/2007 | Qin et al. | ............ | 726/5 |
| 2008/0034205 A1 * | 2/2008 | Alain et al. | ............ | 713/160 |
| 2008/0235775 A1 * | 9/2008 | Lin et al. | ............ | 726/7 |

* cited by examiner

*Primary Examiner* — Krisna Lim
(74) *Attorney, Agent, or Firm* — David R. Stevens; Stevens Law Group (57) ABSTRACT

An internet data exchange authentication method that can provide much of the user authentication assurance and capability of dedicated computer security cryptographic hardware, without requiring that the user actually have such hardware. This method allows users with computerized devices to communicate securely with secure servers by creating customized challenge-response authentication objects (pockets) where both the challenge and the response is based partially on the hardware identity of the user's computerized device, and partially on a secret (such as a random number) known only by the secure server. The secure server receives the device's hardware identity, generates the secret, creates the pocket, encrypts the pocket, and sends the encrypted pocket back to the user's device. The secure server, or a third trusted credential server, then sends the decryption key for the encrypted pocket back to the user using a different, "out of band" communications modality, thus reducing the chances of interception.

49 Claims, 7 Drawing Sheets

Figure 1

Pocket initialization & termination

Figure 2

Data flow during pocket activation

Figure 3

Customized, pocket mediated, secure communication

Figure 4

Credential & token flow during a pocket mediated secure session

Figure 5

Pocket Data Transmission Protocol

Figure 6

Hardware-Bonded Credential Protocol

Figure 7

Hardware-Bonded Credential Transport Protocol

HARDWARE-BONDED CREDENTIAL MANAGER METHOD AND SYSTEM

BACKGROUND OF THE INVENTION

Internet based communications have become ubiquitous in the modern world. With this success, however, have come major security issues. Problems of identity theft, man in the middle attacks, spooking (spying), phishing (attempting to acquire sensitive information by fraud), and other types of computer crime are rampant, and much effort has been devoted to devising technological countermeasures to reduce the severity of these issues.

One large problem is eavesdropping, message alteration, or generation of false messages. This often is due to "man in the middle" attacks. In these attacks, the attacker intercepts data packets (usually TCP/IP packets) as they are transmitted between a user's computer and a remote internet server. Alternatively the attacker attempts to impersonate the remote internet server, and trick the user into divulging sensitive information (phishing).

To cope with this type of attack, a number of standard secure cryptographic protocols, such as Transport Layer Security (TLS) and Secure Sockets Layer (SSL) have been developed. These protocols work by a method in which the user's browser and the remote server first identify themselves (the user usually using a password, and the remote server by using an authenticated certificate that is trusted). The user and server negotiate a cryptographic protocol, and thereafter exchange data using the negotiated cryptographic protocol. SSL technology is now a common part of standard internet browsers, such as Internet Explorer 7.0, Firefox 2.0, Safari, Opera, and others.

One drawback of standard SSL and TSL methods, however, is that while the remote server is carefully authenticated, the user is not as carefully authenticated. Most commonly, users are authenticated only by various types of "secret" user passwords that are assumed to be known only by the user.

Unfortunately, modern attackers have become very sophisticated at stealing these passwords. Methods such as Trojans, key loggers, etc. can be set to quickly and efficiently detect passwords, and pass them to attackers in an almost real-time basis. Once an attacker acquires such passwords, the attacker can then impersonate the user, gain access to the remote website, and (ironically aided by TSL and SSL) download sensitive data, upload false data, gain access to bank and credit accounts, and in general cause a great deal of damage. Even user fingerprints can be lifted off of a surface that the user touches, duplicated, and then used to trick fingerprint sensors.

To prevent this type of stolen password attack, companies, such as Authenex Corporation, of Hayward Calif., have introduced a second level of security, which additionally requires that the user also identify himself or herself by an item that the user possesses ("thing" protection). The concept is not unlike a bank requiring both a bank card (thing) and a user PIN number to access an ATM account. By requiring that the user both know a secret and possess a specific item, the task of an attacker is made substantially more difficult.

Authenex produces a number of convenient miniature electronic "token" devices that plug into computers, and provide electronic secrets and security keys (tokens) that ensure data security. These devices are about the size of a standard Universal Serial Bus (USB) memory dongle, or car key, and in fact Authenex token devices often plug into a computer's USB port. Because these devices are small, they can be put on a keychain for convenient handling.

The Authenex A-Key 3200, for example, is a small device that provides public key (PKI) encryption by providing on-board 1024/2048-bit RSA key pair generation and X.509 digital certificates. The A-Key also performs symmetric key cryptography using AES 128-bit and 256 bit, DES, 3xDES, DES-X, MD5, RC2 functions, as well as SHA-1 secure hashing algorithms. The A-Key exchanges secret security keys by plugging into a computer via a USB port, and the key allows users, assuming the computer itself is secure; to insure that any hostile attacker that intercepts the A-Key encrypted data will not be able to decrypt the data.

Authenex also produces other security devices, such as the A-Key 4000 token, which allows users to store up to 1 gigabyte of data in a password encrypted manner using a second key sized USB token or dongle. A number of other A-Key USB security devices are also in development. These devices are described in US patent application disclosures 2003/0081774, 2004/0181673, 2004/0064740, 2004/0064706, 2005/0015588, 2005/0033995, 2006/0004974, 2006/0075486, and U.S. Pat. Nos. 7,191,344 and 7,231,526, and the contents of these disclosures are incorporated herein by reference.

Although effective, such physical security devices must be carried by the user. Like all physical objects, such physical security devices can be lost, misplaced, or stolen. Thus further improvements in providing convenient yet high security access to data, computers, and networks is desirable.

SUMMARY OF THE INVENTION

In this disclosure, an improved authentication method is described that can provide much of the user authentication assurance and capability of earlier physical "Key" computer security "token: devices, without requiring that the user actually have such a separate physical security device. This disclosure teaches that it is possible to create a new type of hardware based "credential manager" security key system, without requiring that the user actually carry a dedicated physical key or other dedicated security device.

Conventional computerized devices connected to the internet communicate by sending data packets to and from specific communications end points, called sockets. Sockets can be viewed as the combination of an IP address and a port number, or more completely, a protocol, local IP (internet protocol) address, local port (number in the header of a data packet that directs the data to a process running on a computer), remote IP address, and a remote port.

This disclosure teaches a new hardware based "credential manager" security method that combines the specific hardware component identities from the user's particular computerized device (and optionally other user information such passwords or biometric information) at one communications end point, with a secret (i.e. secret data, such as a large random number) from the other communications end point (such as a network server), to create a new type of "challenge-response object" suitable for secure encrypted network communications. This challenge-response object is termed a "pocket". Here the term "pocket" is a slight play on words, because while a "socket" is designed to assist any type of point-to-point network communications a "pocket" is designed to assist secure point-to-point network communications. However in other respects, the concepts diverge, so the play on words should not be taken too literally.

Thus, in spite of this play on words, the term "pocket" is best understood as a unique way for a computerized device to communicate with a network server using challenge-response authentication, while taking active steps to ensure that the authentication passwords are not actually exchanged over the internet. Because the challenge-response data contained in a pocket is based in part upon information pertaining to the specific hardware identity of a particular networked computerized device, systems and software programs that use pockets are often referred to in this specification as "hardware bonded credential managers".

Pocket based challenge-response authentication provides secure network communication between a networked computerized device, and a secure network server, by making use of the fact that typically the networked computerized device hardware will have a unique identity. This hardware identity might be made up of items such as the hardware's central processing unit (CPU) identification number, media access control (MAC) network address, memory size, graphics capability and so on, and by the time that all the different hardware identification items are combined for a particular unit, the size (in bits or bytes) of this hardware identity information is usually large enough that it becomes difficult or impossible to guess. The pocket based encryption also makes use of the fact that remote servers can possess secrets (secret data), such as kilobit length random numbers (i.e. random numbers so large that they are expressed in terms of binary numbers of 1024, 2048, 4096, 8192, 16,284 bits or more—i.e. 1, 2, 4, 8, 16 kilobits). These secret random numbers (or other secret data) can be made so large that attempts to duplicate or guess these random numbers are also computationally infeasible.

If the network computerized device transmits its hardware identity information to the secure networked server, the secure network server can then combine the hardware identity data with the server's own secret random number (or other secret data) to create a challenge-response object. Thus the challenge data and the response data are typically based on a function or cryptographic process that combines the hardware identity of the user's computerized device, and the secret random number known only by the secure server, to create highly secure challenge and response "passwords".

If a reasonably secure way can be found to transmit this challenge-response object (pocket) back to the networked computerized device, then this pocket can then subsequently be used to allow the computerized device and server to authenticate themselves with the secret passwords, optionally encrypt data (e.g. use the authentication secret passwords to encrypt the data), and carry on secure communications.

As will be discussed later and in more detail, to securely transmit the pocket back from the server to the networked computerized device, the pocket encryption key is itself encrypted to keep it safe in the event that it is intercepted by an attacker. To do this, the pocket will typically be encrypted using both a first pocket encryption/decryption key which may be produced from the original hardware identity data, and an additional second pocket encryption/decryption key (which can be a second random number or other data), and then sent back from the server to the networked computerized device. Thus both the first pocket encryption/decryption key and the second pocket encryption/decryption key are needed to decrypt and use the pocket.

To decrypt the pocket, the networked computerized device, which knows its own hardware identity data (and thus the first pocket encryption/decryption key), must somehow also receive the second pocket encryption/decryption key from the server before it can decrypt the encrypted pocket and use the pocket. To reduce the chances of interception, this second pocket encryption/decryption key (e.g. an activation code) is sent back from the networked server to the networked computerized device by a "out of band" communications means that is different from that used to earlier send the original hardware identity data, and/or the encrypted pocket. Thus an attacker who has tapped into the main communications channel and has intercepted the encrypted pocket will be unable to decrypt the pocket because the first pocket encryption/decryption key is based upon the computerized device hardware, and the second pocket encryption/decryption key is being sent over a different communications channel.

Once the computerized device receives and decrypts the encrypted pocket, the computerized device can then use the secret challenge-response data (passwords) contained in the pocket to authenticate themselves, and optionally (and usually) use the passwords to encrypt their subsequent communications. As one example of pocket assisted encryption, the side sending data can first encrypt the data using the response portion of the pocket as an encryption key, and create a data packet containing both the encrypted data as one field, and the challenge portion of the pocket as a second field. The side receiving the encrypted data can read the pocket challenge field, look up the pocket response, and then decrypt the encrypted data using the pocket response as a decryption key. For added security, the encrypted data can additionally contain a secure signature field (such a Pretty Good Privacy—PGP signature) in addition to the data payload itself.

For highest security, the pocket software will not store the decrypted pocket in the permanent memory of the networked computerized device, but will rather store the pocket in encrypted form, and only dynamically decrypt the pocket when needed, and keep the decrypted pocket challenge-response data in volatile memory.

Such hardware-bonded credential managers and pockets can either be used as an additional security layer "on top" of existing computer cryptographic security methods, such as SSL, or alternatively may be used to in conjunction with different computer network authentication and cryptographic methods, such as Kerberos security methods or other customized methods.

Pocket-based hardware-bonded credential managers can then be used as the foundation to construct many different types of secure network systems, and find many applications in user friendly web browser/server based secure internet systems.

DETAILED DESCRIPTION OF THE INVENTION

In one aspect of the invention, the pocket/hardware-bonded credential manager security method used here can be used as part of a computer or computerized device's internet web browser. Such computers or computerized devices (often referred here as simply "computerized devices" or "device") can consist of desktop computers, laptop computers, cell telephones, personal digital accessories and other such devices.

The hardware-bonded credential manager method can also be regarded as a device-bound user cryptographic security key or token manager. Because it is bound to the hardware characteristics of the user's computerized device, and optional user secret information as well, this method is essentially equivalent to requiring both that the user know something and that the user have something—in this case the device's unique hardware components and/or network address. If biometric information is used as part of the user information component, the method can be even more secure because it would then require that the user both know something, have something, and be something.

As previously discussed, this "must have a specific user thing" requirement makes the task of typical attackers much harder. Typical attackers can easily steal user passwords by use of Trojans, keystroke loggers, or network packet sniffing. In fact, many attackers can do so from thousands of miles away. However it is much harder to physically steal the user's actual computerized device hardware. This requires the attacker be physically present as a burglar or thief, which is orders of magnitude harder and also increases the attacker's physical and legal risk.

At the same time, as previously discussed, by utilizing the inherent hardware characteristics of the user's computerized device, and associated other methods, to bind the specific type of encryption used to a single unique piece of hardware, the present methods free the user from the need to carry an additional piece of security hardware, such as a USB security token or key, which results in greater user convenience and satisfaction.

The software used to create and manage such pocket based hardware-bonded credentials (virtual cryptographic tokens) can be added as a plug-in or standard feature to a standard internet browser, such as Internet Explorer, Firefox, Opera, Safari, or other browser, and as desired may often make use of standard browser features, such as SSL cryptography functions, and other features. Alternatively the hardware-bonded credentials may be implemented on a stand-alone basis, or integrated as part of some other network capable program, as desired. Although, to keep this disclosure of a manageable length, the internet browser plug-in example will most frequently used as a specific example of the present art, the browser plug-in example is not intended to limit the scope of the invention in any way.

Nomenclature: As previously discussed, throughout this document, the term "pocket" refers to a challenge-response object, useful for challenge-response authentication purposes, that is based upon at least the hardware identity of the user's networked computerized device, and a secret (secret data, such as a large random number) known by the secure networked server that the device wishes to communicate with. Although a pocket's challenge-response authentication data may additionally also make use of (i.e. be a function or cryptographic process of) additional user information, such as a user password or user biometric information, this additional user information is an optional component. The information contained in a pocket can, at a minimum be used as passwords for challenge-response authentication. In many embodiments, however, these challenge-response passwords will also be used to encrypt the data as well.

The pocket itself is essentially a passive authentication-response object (data). In its simplest form, it is a matched set of challenge-response data, where the challenge data part of the matched set is usually produced by a function or cryptographic process using the hardware information and the secure server secret (e.g. random number) as an input, and the response data part of the matched set is usually also produced by a function or cryptographic process (which may be different from the first function or cryptographic process), using the hardware information and the secure server secret as an input.

The software that manages the pocket, and uses the pocket for authentication and secure communications, is termed the hardware-based credential manager. It should be understood that pockets use hardware-based credential manager software, and the hardware-based credential manager software uses pockets. Thus often only one term or the other term will be explicitly used, but the presence of the other term should be understood as usually being implied from the first term. Note also that occasionally the hardware-based credential manager software is spoken of in the brief form as "pocket software".

A pocket will only authenticate communications between a specific user (user ID), running a specific user computerized device, while talking to a specific secure and authorized web server. A pocket will reject (fail to authenticate) all other types of communications between machines. Thus each user, each user computer, and each secure web server may have its own unique pocket based challenge-response authentication "passwords" (data). A typical user, who may wish to communicate to several different secure servers (for example, the user's bank server, the user's work server, and one or more user store servers, etc.), will thus need a different and unique pocket for each secure web server. These various pockets can in turn, be viewed as being controlled and managed by a "pocket store".

Other pocket aspects: In addition to incorporating the hardware identity of the user's networked computerized device, the pocket may optionally also incorporate the individual user's secret user information (such as names, passwords, one time passwords (OTP), codes), and/or user biometric information (such as fingerprint information, face recognition information, or voice recognition information) and use this user information as part of the challenge-response authentication password. For convenience, this user information can be both thought of, and handled as various additional data fields that can be appended to the other user computerized device hardware identity information fields, creating an extended device/user hardware identity. Thus different users using the same computer, and communicating with the same secure server, may nonetheless use different pockets if the pocket is configured to use the optional user data (passwords, biometric signatures) as part of the pocket's protocol.

Although many internet communication methods and protocols are possible, to maximize compatibility with firewalls, the hardware-based credential manager software will often communicate to secure web servers and authorization servers (to be discussed) using HTML or XML, and using standard http and https ports such as port 80, and port 443.

Although not essential to the present invention, use of standard ports 80 and 443 is useful because Firewalls are generally designed to pass this type of data traffic with little or no obstruction. Thus although such HTML, XML, HTTP, HTTPS, port 80, and port 443 examples are thus frequently cited, these examples are not intended to limit the scope of the invention in any way.

Similarly, although the Internet, arguably the world's largest data network, is frequently used as an example in this specification, it should be apparent that these methods will work for a wide variety of different networking systems, and thus the specific internet examples cited are also not intended to limit the scope of the invention.

Similarly, although Secure Sockets Layer (SSL) is frequently cited as an example of a useful cryptographic method for secure data exchange for the present purposes, the methods of the present invention may be used with a wide variety of alternate encryption methods as well. Examples of such alternate methods include single key, secret key, symmetric encryption, public key, SSL protocols, Kerberos protocols, PKI protocols, RSA, PGP (pretty good privacy), SET (secure electronic transactions), DES (data encryption standard), or customized encryption protocols.

Initialization:

The method assumes that the user has access to a standard computer or computerized device that contains at least one standard processor, memory, and unique or at least device specific hardware characteristics. The method also assumes that an alternate communications channel is available. In some cases, this alternate communications channel can be another piece of communications hardware, such as a cell phone or land-line telephone connection. Alternatively, the alternate communications channel can be email, or even a physical letter delivered by conventional mail. This alternate communications channel will be designated as an "out of band" communications channel.

As previously discussed, in the simplest embodiment, the pocked method consists of method of authenticating network communications between a user with a networked computerized device, and a secure network server. In this method, the networked computerized device has a hardware identity (i.e. device ID codes, hardware configurations), and the secure network server has a secret, such as a long random number. In this method, the network computerized device transmits its hardware identity data to the secure network server. The network server, which now has both the hardware identity data and its own secret data (the large random number) can then combine the two sets of information (often using a function or cryptographic process to scramble the input data together) to create a challenge-response object (the pocket) useful for authenticating (i.e. password authenticating) and optionally encoding and decoding encrypted communications between the two devices.

Although in principle, the pocket data could be physically carried back from the server to the computerized device in a non-encrypted form, this method is rather cumbersome for routine use. As previously discussed, a more convenient way to transmit the pocket back from the server to the computerized device is to encrypt the pocket. This way, if the encrypted pocket is intercepted by an attacker, it will be useless to the attacker.

In one embodiment, the server may encrypt the pocket for transmission back to the computerized device using two different pocket encryption/decryption keys. The first pocket encryption/decryption key can be based on the hardware identity of the computerized device, which the computerized device already knows, but which usually will not be previously known by most potential attackers. The second pocket encryption/decryption key can be another secret (such as a second random number, or a cryptographic mix of the hardware data and a random number). To guard against the possibility that the main communications line is being intercepted by the attacker, the second pocket encryption/decryption key will ideally be sent back using a "out of band" communications method that is different from the main communications line.

This "out of band" communications modality can be anything from oral communications, to telephone or fax communications, a different internet channel (such as email), or even carrier pigeon, but typically the "out of band" channel choice is somewhat of a compromise between convenience on the one hand, and security on the other hand. Email, for example, is very convenient and since it uses different internet ports and can originate from different servers, qualifies as an "out of band channel". However email does still travel over the internet. For higher security but less convenience, alternate communications channels that do not rely upon the internet, such as oral communications over a non-internet connected telephone network, can also be used. The information carried by the "out of band channel" can be viewed as a type of activation code.

Once the networked computerized device receives the encrypted pocket and the "out of band" communication containing the second pocket encryption/decryption key, the device can then use its own hardware information (used in the first pocket encryption/decryption key), and the second pocket encryption/decryption key, to decrypt the encrypted pocket. Once this is done, the networked computerized device can then use the pocket challenge and response data to communicate with the network server in a secure manner.

Many types of secure encryption are possible using this scheme. In one example, the side sending data can send it as a packet with the pocket challenge with the data encrypted in a way that needs the pocket response to decrypt. The side receiving the data can recognize the pocket challenge, and use the pocket response to decrypt the data and read the message. The data can also contain a signature section as well, which when decrypted can additionally verify the identity of the sender.

One problem that can occur, however, is what may appear to be a secure server is actually a hostile server that has been mimicked or spoofed by an attacker. In addition to tricking the user into directly revealing secrets by establishing "secure" communication with a hostile server, even less immediately relevant information, such as the hardware identity of the user's networked computerized device is also valuable information. For example, an attacker that contemplates also obtaining the encrypted pocket, and intercepting the "out of band" communication channel may wish at least to trick a user to begin the pocket based authentication process in order to at least obtain the hardware information.

Can the "secure" server actually be trusted? To help resolve this issue, other software and systems, such as credential manager servers, can be used to help guard against hostile servers, and insure that the process is both user friendly and secure.

Preferably, the credential manager is a server or process that both the user and the network server (often a secure web site) trust. Since user passwords and computerized equipment can fall into the hands of attackers, in some embodiments, it is desirable to also have a process to revoke, deactivate, or deauthorize such "pocket" or pocket software. In one embodiment, this "pocket" can simply be set to automatically expire after a certain lapse of time, such as a day, week, or year. In an alternative embodiment, the pocket can alternatively or additionally be configured so that its authorization can be revoked by the user, secure web server, or the credential server. Thus, for an example, a user upon losing a laptop computer might send a request to a credential server or secure web server to revoke pocket authorization (i.e. let the secure server know that the particular challenge/response used in the pocket is no longer trusted). Alternatively a secure web server might decide to revoke pocket authorization if suspicious activity is suspected. As a third example, a credential server might revoke pocket authorization if the credential server becomes aware that the supposedly secure web server is in fact being used improperly, such as for phishing attacks on unsuspecting users.

In order to accomplish this customization process, the pocket or pocket software may, in some embodiments be either decrypted, activated or authorized by the mutually trusted credential server. Often, however, the pocket will be generated by the secure web server, and then subsequently authorized (often by sending appropriate decryption information) by the credential server. In either event, as previously discussed, the pocket and the pocket software must be transferred to the user's computerized device in some manner.

Various means may be used to transfer the pocket and the pocket software to a user's computerized device may be used. In a very low trust environment, this transfer may be done by a direct physical transfer in which the pocket and the pocket software is loaded onto the user's computerized device by some sort of data storage media, such as a CD disk, flash memory card, or other media.

Often however, such direct physical transfer methods will be overly cumbersome, and network or internet transfer of such customized pocket software will be desired.

Although the pocket software could be transferred over the network, and directly installed by the user, this process may be somewhat complex. To make the pocket and pocket software initialization process simpler, often suitable "pocket initialization" software may be used to facilitate pocket installation. This pocket initialization software may be pre-installed by the computer device manufacturer and be supplied as part of a standard set of software on the user's computerized device. Often however, no such pocket initialization software will be previously resident on the computerized device. Rather, the pocket initialization software will be downloaded by a user from either a trusted credential server or a secure web server.

Because this pocket initialization software works with the computerized device hardware and user information to create hardware-bonded credentials or "virtual tokens" for secure communications, the pocket initialization software will frequently be referred to in the alternate form as a hardware-bonded credential manager initialization program, pocket creation program, or alternatively as a virtual token program or process.

In one mode of operation, when a user first attempts to register with a secure internet server, such as a bank, the user may first login to the web resource using conventional (unsecure) http protocols. After suitable preliminary messages are exchanged, the secure server will commence the pocket initialization or hardware bonded credential manager initialization process by downloading a first set of pocket initialization software to the user's computer. If the user's computer is running Microsoft Windows and/or Internet Explorer, this first set of virtual token software may be an ActiveX program, or other program with adequate privileges on the user's computer.

Alternatively the secure internet server may simply provide an installation program for download to the user's computer, and this installation program may come in many different versions designed to accommodate a variety of different operating systems and computerized devices.

After the pocket initialization software has been installed, this software will in turn initiate a request to generate or produce a pocket As previously discussed, each individual pocket's challenge and response data is based on functions or cryptographic processes that use at least the user's computerized device hardware and a secret (such as a large random number) residing on the specific secure internet web server that the user wishes to exchange information with in a secure manner. As previously discussed, the pocket may optionally also be based upon optional specific user information, such as user passwords or biometric information.

As a result, often each user, each set of user hardware (often the user computer and/or internet access address), and secure domain (such as the group of commonly controlled servers that may make up a secure domain such as securedomain.com) will have its own unique pocket.

The secure server may often handle this pocket generation request directly itself, and use the hardware identity and optional user information, in combination with its own secret information, to generate and encrypt a pocket. However in some embodiments, the secure server may alternatively pass at least portions of the pocket request (such as the transmission of pocket authorization or decryption "out of band" keys) on to a third server, which is a provision or credential server that the user trusts.

The trusted provision or credential server is useful because a user acting directly with such a "secure" server might not be able to distinguish between really "secure" server, and a hostile server attempting to trick or "phish" the user. Since there are thousands or millions of potential server sites on networks such as the internet, keeping track of which are legitimate and which are not is difficult. Here a small number of trusted provision or credential servers can manage this burden, keep track of the truly authorized servers, and only activate decrypt pockets coming from the truly authorized servers.

This provision or credential server can establish itself in a position of trust through agreements with recognized computer equipment and software manufacturers, and be available as a standard option on the user's machine. Alternatively, the provision or credential server may establish its trust through other means such as advertisements or endorsements from other commonly trusted sources.

A new web site wishing to establish itself as a "secure" web site will typically work with an established provision or credential server to establish that the new secure web site is legitimate, and not a fraudulent or phishing site. Thus a secure web site can assure the user that it is legitimate by passing the user request on to the provision or credential server, which will in turn work with the user's computer to verify the secure web site's legitimacy.

Note however, that if the secure web site does not wish to avail itself of this additional level of security and trust, the secure web site may take on the functions of the provision or credential server itself. For brevity and clarity, in this disclosure, the functions of the provision or credential server will occasionally be shown and discussed in diagrams as being different from the functions being carried out on the secure web server, but since the functions may be combined, these separate provision/credential server examples are not intended to be limiting.

In order to effectively bind the virtual token to something the user has, two things are needed. The first thing is data pertaining to the unique hardware characteristics of the user's computer. Ideally this should be some physical aspect of the user's computer (or computerized device) components that change relatively slowly, such as the user's central processor (CPU) identification number, and/or the user's defined internet Media Access Control (MAC), or Ethernet Hardware Address (EHA) addresses. In principle however, other aspects of the user's hardware such as amount of random access memory, video system, hard drive systems, peripherals, etc. also can be used. Note however that if the user's system is compromised by a sophisticated virus or Trojan (Trojan horse program—i.e. hostile software that spies on the user), it is possible that this user system hardware information still could be obtained and used for an attack. Thus, as previously discussed, this user hardware data is itself very sensitive information, and it should only be released to a very trusted source, such as the provision or credential server.

Various types of protocols may be used to transport the user hardware identification data and/or user data over the internet. In one type of protocol, the information pertaining to the computerized device hardware or user information may be hashed into a manageable sized key, such as a 16 bit hardware key, using standard hash functions such as the Secure Hash Algorithm 1 (SHA1) method. This data may be further protected by using various random bytes to encrypt the hashed hardware key, along with a secret encryption key, using a standard encryption algorithm such as the Advanced Encryption Standard (AES) algorithm.

As previously discussed, one problem that can occur is that if the "secure internet server" that the user trusts is actually a hostile web server, the hostile server may gain access to the pocket initialization software, and attempt to trick the user's computer into sending the sensitive user computer hardware information to the hostile server.

To prevent this, and ensure that the user's computer is in fact working with a web site (secure internet server) that is at least also trusted by the provision/credential server, the provision/credential server can send a first trusted (difficult or impossible to forge) confirmation message directly back to the user or user's computer using a communications modality that bypasses the possibly hostile (security not yet confirmed) web server. This confirmation message is intended to assure the user and the user's hardware bonded credential manager system that the web server is trusted, and to give permission for the user's hardware-bonded credential manager system to now transmit the sensitive user computer hardware information. As previously discussed, this trusted confirmation message may be sent by an "out of band" modality that bypasses the not yet verified web server.

Note that there may be either one, or more than one "out of band" message sent during the pocket setup and activation process. There can be a first "out of band" message from the credential manager system that essentially informs the hardware based credential software that the secure server is authorized, and that it is safe to send out (encrypted) hardware information to the secure server. There can also be a second "out of band" message from either the credential manager system or the secure server that contains the second pocket encryption key needed to decrypt the encrypted pocket. As another alternative, the functions of the two messages may be combined in to one message, such as a first "out of band" message from the credential server that both informs the user's hardware bonded credential manager system that the secure server is OK, and the same message can also contain a second pocket encryption key that can later be used to decrypt the encrypted pocket that will later be sent by the secure server.

The "out of band" confirmation message may send a "first activation code" to the user and the user's pocket installation software, telling the user and the user's software, that the not yet verified web server is, in fact, trusted, and that it is OK to start transmitting the sensitive user hardware information. This "first activation code" can alternatively be termed a "hardware disclosure authorization" code. This "first activation code" can either be the same as the second pocket encryption key, or alternatively can be a portion of the message that is distinct from any second pocket encryption key portion of the message.

Like any other "out of band" message, the "out of band" confirmation message carrying the first activation code or hardware disclosure authorization code should itself be designed and transmitted in a way that is difficult or impossible to forge or intercept. As previously discussed, there are various ways to do this. One way is to send the confirmation message and a hardware disclosure authorization code via a different internet channel, such as email, ideally encrypted or signed in such a way that the pocket initialization software can recognize the signed email as being from the provision/credential server.

Alternatively, the "out of band" confirmation message may be sent back using a different communications modality that also relies on a second physical "thing" that the user has. For higher security, this second physical "thing" may not be the user's computer itself. Rather this second physical "thing" may be the user's cell phone (ideally known to be registered to the user), or the user's land telephone line (again ideally known to be registered to the user). In one embodiment, the user may be encouraged directly call or login to the provision/credential server by a different computer, or telephone, and receive the "out of band" confirmation message containing the hardware disclosure authorization code that way.

After the "out of band" confirmation message containing the hardware disclosure authorization code is received, the hardware bonded credential manager software can then send a pocket generation request to the now trusted web server (secure web server). This pocket generation request will often contain the sensitive user computer hardware information, along optional fields such as the user's name and other user identification information.

The secure web server can either use this information directly (act as its own provision/credential server for this part of the operation), or alternatively forward this information to the separate provision/credential server. The provision credential/server will take the user computer hardware information (and any optional user information), generate a secret number, such as a large random number, encrypt the results using the user computer hardware (and optional user information) as input to a first pocket encryption/decryption key, and a second pocket encryption/decryption key (such as a second random number), and produce a unique customized and encrypted pocket that is specific to that secure web server, that user and that user hardware combination. The secure web server itself, or alternatively the provision/credential server, will send this pocket back to the secure web server, who will in turn send this back to the user's pocket installation software on the user's computer.

In an alternative configuration, the secure web server and the provision/credential server may be separate, but may both have the same database of second pocket encryption/decryption keys. In this case, the secure web server can generate and encrypt the pocket (since it has all the relevant information), but the provision credential server (which itself does not know the actual contents of the pocket), can send back the second pocket encryption/decryption key back to the user networked computerized device, preferably by a "out of band" message. This would add another layer of security to the system.

Upon reception of this encrypted, secure web server specific, user customized pocket, the user and the user's pocket installation software will then attempt to do a second activation step in which this secure web server specific, user customized pocket is decrypted (activated).

To activate (decrypt) the (encrypted) pocket, the user and the user's hardware-bonded credential manager software may send a customized pocket activation request to either the secure web server or the provision credential server. The secure server or provision credential server (depending on the configuration desired) may send a message (such as a second pocket encryption/decryption key) back, preferably by an "out of band channel" that can be used, in conjunction with the device's hardware information (first pocket encryption/decryption key) to decrypt and activate the pocket. In some embodiments, the system will also send a confirmation message back to the provision/credential server informing the server that that particular pocket has been activated.

The provision/credential server may optionally then send a return message back to the secure server and the user informing both that the pocket activation process is now complete. As a further check on the integrity of the system, either the secure server or the provision/credential server may require that the pocket activation process take place in a relatively short period of time in order for the pocket to continue to be recognized and authorized by the secure server and/or the provision/credential server.

The pocket is now activated (decrypted), and the activation session is now considered to be over.

Figure 1:
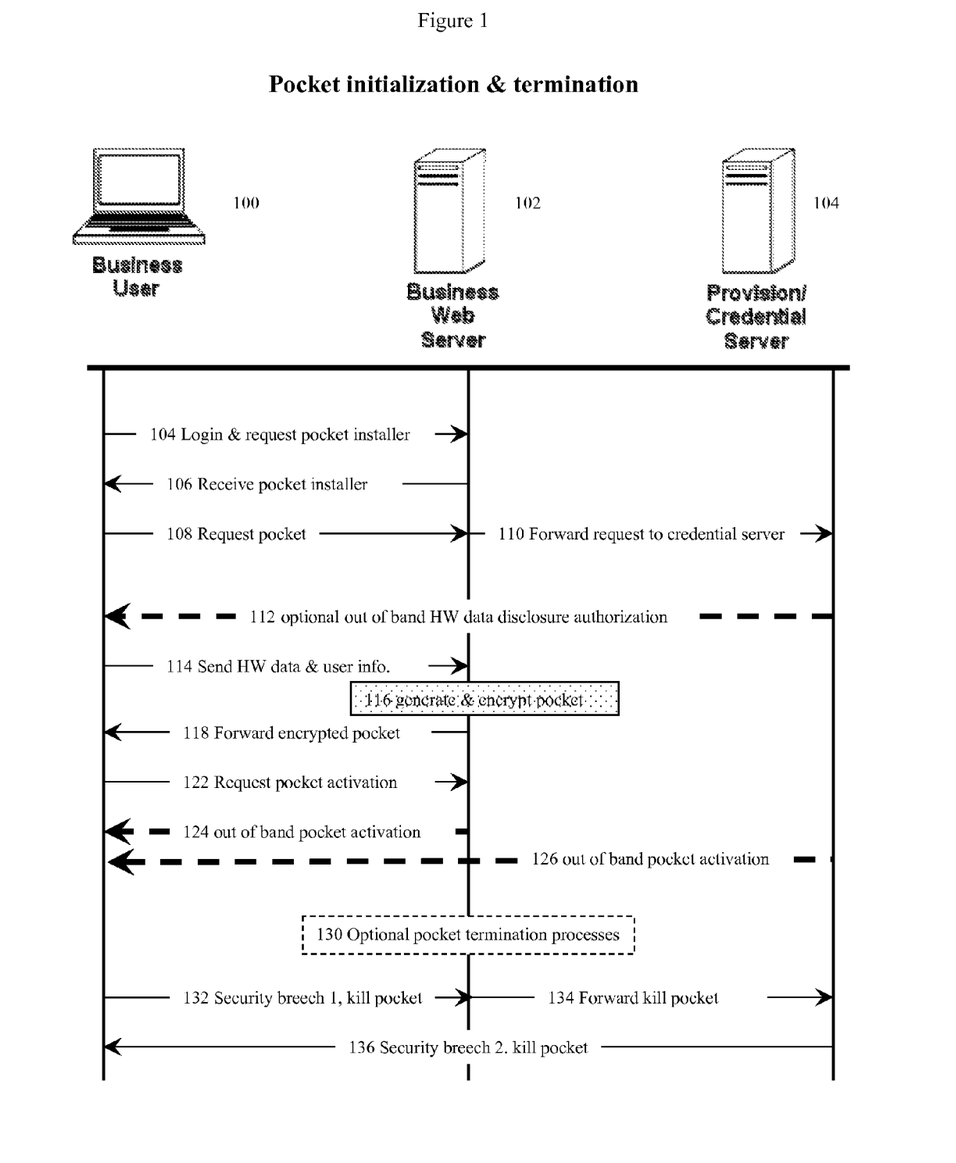
FIG. 1 shows how the hardware-bonded credential manager method can be initialized and optionally terminated.
Figure 2:
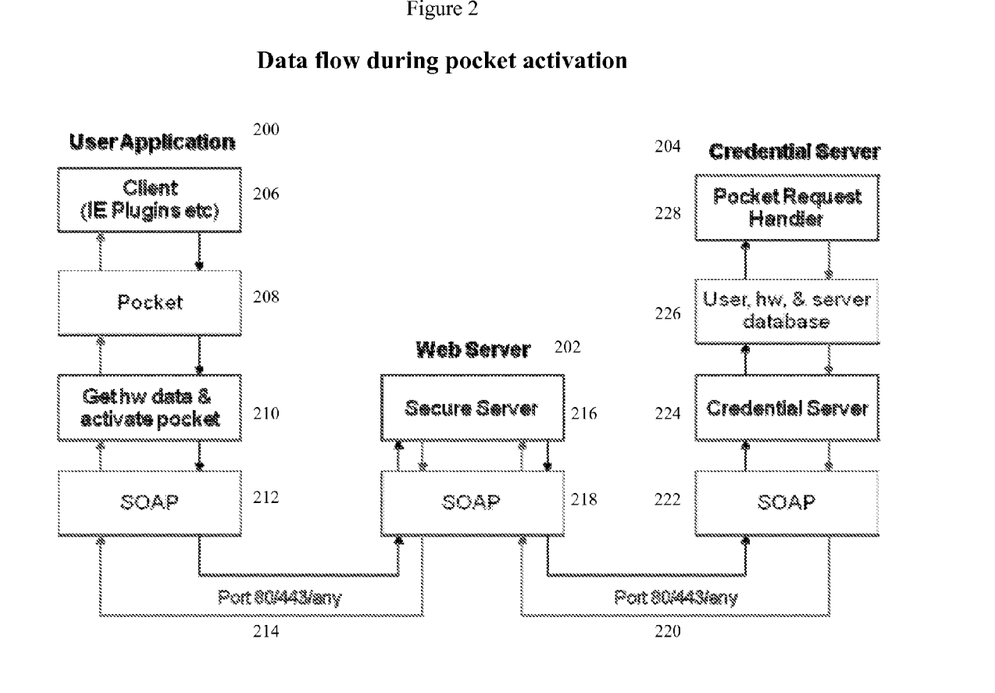
FIG. 2 shows additional details of the data flow between software modules when the hardware-bonded credential manager method is initialized.

A simplified diagram of this process is shown in FIGS. 1 and 2.

FIG. 1 shows how the pocket software is set up (initialized) and optionally terminated. To begin the process, a user using a computerized device (100) wishes to communicate with a web server (102) that the user believes is a secure web server. The user may be a business user communicating to a business web server, or alternatively the user may be a standard (non business) user communicating with a non-business web server, such as a government web server, that has non-business reasons for wanting secure communications. Computerized device (100) is connected to secure web server (102) and a third trusted credential server (104) by the internet or other data communications network.

Computerized device (100) is often based on an X86, ARM, MIPS, or other type of single or multiple core processor, usually will have at least one megabyte (often 64 megabytes or more) of RAM, and often many megabytes or even gigabytes or more of persistent storage memory such as flash memory, hard disk memory, or other persistent storage memory, and often will be running a multi-tasking operating system such as a windows, Linux, Unix or other operating system.

In this process, user on computerized device (100) initiates communication with secure server (102), usually by connecting to secure server (102) over the internet world wide web using a web browser, and http protocol, often communicating using internet port 80 using TCP/IP protocols or other packet protocols. The user's web browser will parse the http and/or html data sent by secure web server (102), and as part of the user's login (104) the secure server (102) will notify device (100) that it is a secure server. In turn, the user's browser will inform sever (102) that it does not have the proper pocket software needed to communicate securely with server (102). To correct this issue, server (102) will often download a pocket installer software module (106) to device (100). Alternatively, device (100) may have a pocket installer software module already installed, in which case step (106) is not necessary.

Device (100) sends a request (108) to the secure server (102) to initialize and activate the pocket software. The secure server (102) receives this request and forwards this request (110) to a trusted credential server (104). Alternatively device (100) may contact trusted credential server (104) directly.

Once the trusted credential server (104) receives the pocket software initialization request, trusted credential server (104) checks to be sure that secure server (102) is itself a trusted server, rather than a malicious or phishing site. Credential server (104) may also check to be sure that the user device (100) is itself not blacklisted for security reasons. Assuming that all is well, credential server (104) will send an "out of band" message (112) directly (not involving server (102)) back to device (100) informing device (100) that secure server (102) is trusted by trusted server (104), and authorizing device (100) to release the sensitive (confidential) device hardware identification information. This out of band message may optionally also contain the second pocket encryption key, or the second pocket encryption key can be sent by a later out of band message.

In some cases, web server (102) may be a malicious server. To prevent a malicious server from tricking device (100) into releasing sensitive information, the out of band OK to disclose hardware data message (112) will preferably be sent by an entirely different communications channel. At a minimum, the out of band signal should be sent to a different internet port (such as an email port) on the user's computerized device using a routing scheme designed to bypass web server (102).

Once the out of band OK to disclose hardware data authorization message (112) has been received, the pocket initialization software on the user device (100) will release the confidential device hardware and optionally the user information data (114) to the secure server (102).

Once the secure server (102) receives this data, the secure server customizes the pocket, by generating a secret, such as a large random number, that only the secure server (102) knows (in this embodiment, even the provision/credential server (104) will not know this). The secure server then takes the user device hardware data, optional user information, and secret, will typically run them through a suitable encoding function or cryptographic process, and produces a pocket with challenge-response data that is unique for user and user device (100) and server (102). Server (102) then will encrypt the pocket, often by using the user hardware information and optional user information as a first pocket encryption/decryption key, and a different secret, such as a second random number, for the second pocket encryption/decryption key (116). The secure server (102) will then send the encrypted pocket (118) back to user device (100).

Once device (100) receives the customized pocket (118), for higher security, it (assuming that it didn't already get the second pocket encryption/decryption key in message (112)) then will usually request that the pocket be decrypted and activated (122). To decrypt (activate) the pocket, either the secure server (102) can itself send an "out of band" message (124) containing the second pocket encryption/decryption key back to device (100). Both the first pocket encryption/decryption key and the second pocket encryption/decryption key are needed to decrypt the pocket.

Alternatively, if both secure server (102) and provision credential server (104) know the second pocket encryption key, the pocket activation request (122) can be sent to provision credential server (104), and the out of band message containing the second pocket encryption key can be sent back to device (100) by an out of band message (126) directly from provision credential server (104). If the out of band message is being sent from a credential server (104), it may additionally be signed with a data field, such as a PGP signature from the credential server, that verifies that the credential server approves of the process.

Typically only one out of band activation step (either (124) or (126)) will be performed. It not usually be required that that both steps (124) and (126) be performed, although of course the second pocket encryption/decryption key could be cut into two chunks and each chunk set back separately by (124) and (126) if this is desired. Simpler embodiments that make minimal use of the provision/credential server (104) may tend to favor use of step (124), while embodiments that make more extensive use of the provision/credential server (104) will favor use of step (126).

Once the second pocket encryption/decryption key is received by device (100), it can use this key, and the first pocket encryption/decryption key information derived from its own knowledge about its hardware information, to decrypt the pocket and start using it.

Thereupon the pocket and the pocket software is activated (decrypted), providing the proper challenge and response passwords (data) for secure communications, and these methods will be described in more detail in FIGS. 3 and 4.

In some cases, it may be desirable to shut down or inactivate the pocket. For example secure server (102) may fall into the hands of an attacker, or device (100) may be compromised, or there may have been a leak of secure data. Trusted credential server (104), upon receiving notice of such security breach by messages (132), (134), may optionally send a pocket inactivation or "kill" message either (136) directly back to device (100), or to secure server (102), or both. This informs user device (100) or secure server (102) to stop using (trusting) the authentication passwords contained in that particular pocket.

FIG. 2 shows additional details of how the various software modules residing in the memory of device (200), secure server (202), or the trusted credential server (204) act to process data during the pocket activation process. In contrast to FIG. 1, in this example, the credential server is taking a more active role in the pocket activation process.

In this example, device (200) is running an internet browser, such as Microsoft internet explorer (IE) (206), and this browser in turn is running the pocket software as a plug-in or add-on software module (208). In this example, the pocket software is communicating over the internet (214) using standard http and https protocols over standard internet ports 80 and 433. As previously discussed, use of http, https, standard internet ports, and standard data exchange protocols such as XML, although not required for this invention, have advantages because data exchange by these methods is usually tolerated by various firewalls, and thus is usually able to go through in a wide variety of different network configurations without interference.

Here the software "glue" that allows the different software modules on the user computerized device (200), the secure server (202), and the credential server (204) can, particularly if XML is being used, be the commonly used Simple Object Access Protocol (SOAP) protocol (212), (218), (224). Because firewalls are very tolerant to SOAP methods, these methods are commonly used for web services applications. Other types of protocols, such as Common Object Request Broker Architecture (CORBA), etc., may also be used, however, and may be more efficient in situations where firewalls are less of a concern and/or higher speeds are desired.

Thus in this activation scheme, the pocket internet browser plug-in (208) communicates with the web server (202) using an http mediated XML protocol brokered by SOAP. After the user and system receive an "out of band" (112) confirmation that secure web server (202) can be trusted, the pocket plug-in (208) gathers the hardware identification information for the computerized device (100), and sends this information to the secure web server (202) via connection (214). The security module (216) of web server (202) receives this hardware information, and optional user information, and additionally generates a random "secret" large binary number. The security module (216) then creates the pocket authentication-response object, and encrypts the pocket using a first pocket encryption/decryption key derived from the hardware information (and optional user information), as well as a second pocket encryption/decryption key that is also known by the credential server (204). Secure web server (202) can then relay the success of the pocket creation and encryption process back to the credential server (204), and request that credential server (204) send an out of band activation message, containing the second pocket encryption/decryption key, back to user application (200). The web server will not send its secret random number to credential server (204), but may share some information about the user application (200), such as a hashed or encoded description of the user application hardware, to credential server (204) so that credential server (204) can maintain a database of the status of various pockets, the second pocket encryption/decryption keys for the various pockets, and at least a vague knowledge about the status of the user's hardware. This information is relayed to credential server (104), (204) via connection link (220), SOAP protocol (222) to the credential server software module (224). This module in turn stores the obfuscated user hardware information, and secure server information, pocket status, and second pocket encryption key information in a database (226).

The credential server can then use its database (226) to send out of band pocket activation (decryption) messages back to the user device that contain the second pocket encryption key, possibly further encoded by a user hardware specific code, back by pocket request handler (228).

Once generated, this customized pocket activation code is passed back though the various software modules to an out of band transmitting process (not shown), and back to the computerized device (100), (200).

Use During a Routine Session

In routine use, a user will communicate to a secure web site using the hardware-bond credential manager software and the particular pocket for that user, user computer hardware, and secure web site. Here a typical secure session will be discussed. As before, for simplicity, the example use is that of a hardware bond credential manager/pocket plug-in or add-on to an internet browser.

When a user opens up a connection to a secure web site, and reaches the secure website's log in page, the hardware-bonded credential manager plug-ins connected to the user's web browser parse the HTML tags from the site, detect that the user is talking to a secure web site, and the credential manager requests that the secure web site send it a secure cryptographic token for that particular session. But is the user still a valid user, or has an attacker managed to successfully steal the user's identification? To check this, the secure web site forwards the request for a secure cryptographic token to the credential server. If this particular combination of user, user computer hardware, and secure web site is still good, the provision/credential server generates a unique confirmation cryptographic token, and sends the confirmation cryptographic token back to the secure web server. This secure web server in turn relays the confirmation cryptographic token back to the user's computerized device. The pocket software on the user's computerized device uses the cryptographic token to encrypt secure communications between the user and the web server.

Figure 3:
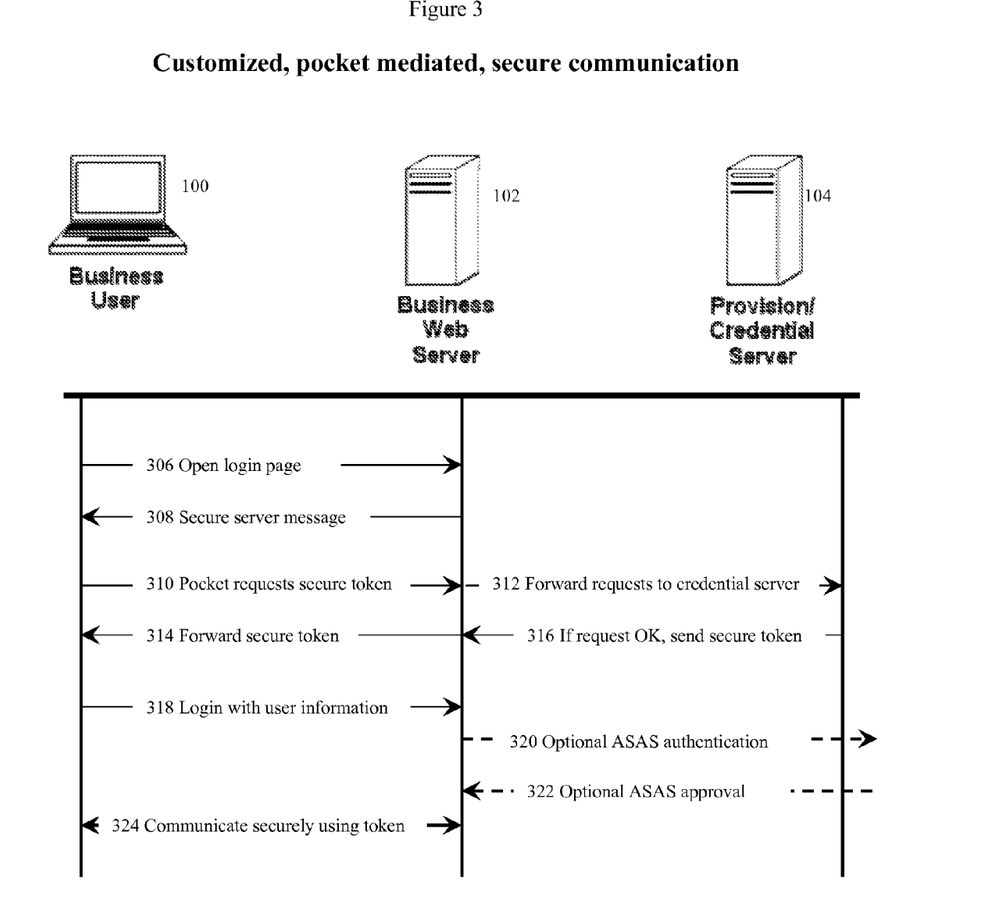
FIG. 3 shows how credentials and tokens are exchanged between a user, a secure server, and a credential server using the hardware-bonded credential manager method.
Figure 4:
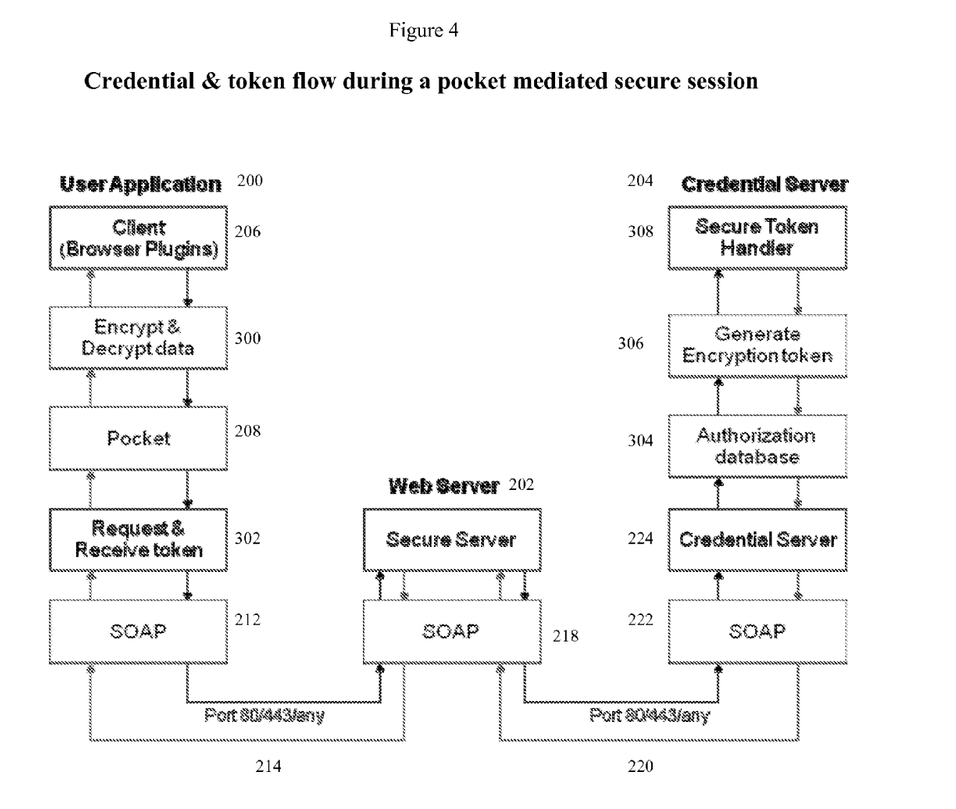
FIG. 4 shows additional details of the data and token flow between software modules when the hardware-bonded credential manager method is used for routine data communications between a user and a secure server.

A simplified diagram of this process is shown in FIGS. 3 and 4.

In FIG. 3, the computerized device (100) and the business web server (102) have been properly equipped with customized pocket software, authorized by credential server (104), and properly activated. A user now wants to exchange secure information between device (100) and secure server (102).

To do this, the user opens a web browser on device (100), directs the browser to the secure server (102), and finds the login page (306). The secure server (102), either as part of the initial login, earlier, or later, then sends (often as embedded html or xml data), information that the web server is a secure web server able to communicate by the pocket mediated virtual token protocol.

Here the passwords contained in the pocket challenge and response object are used to establish that both device (100) and secure (102) are trusted and talking to the right devices, however often additional levels of encryption are also desirable. Although the passwords can be used themselves as means to encrypt and decrypt communications, more rapidly changing encryption schemes are often desirable. In this example, additional active encryption schemes, mediated with the help of a provision credential server (104), are also taking place.

For secure communications, the device (100) and the secure server (102) desire to encrypt their communications using one or more additional rapidly varying shared secrets, keys, or tokens. Thus for each secure communications session, and in fact optionally multiple times during a secure communications session, the device (100) and the secure server (102) will coordinate, exchange, or manage the cryptographic tokens that they are using by the aid of the credential server (104). To do this, the pocket software on the user's computerized device (100) may send a request for a secure cryptographic token (310) to the secure server (alternatively, this request may be assumed to follow from login (306), and the secure server (102) may optionally proceed without request (310). The secure server (102) will send a request (312) for such cryptographic tokens to the credential server (104). The credential server (104) will use its database (226) of secure server, user information, and computerized device information to verify that this is a secure and properly authorized communication. If so, credential server (104) will generate or at least authorize cryptographic tokens for the session (316), and the secure server (102) will forward these (314) to the computerized device (100). Alternatively, server (104) will continue to generate different tokens as the communications session continues in order to ensure still higher security.

Once the pocket software on computerized device (100) receives the appropriate token, the user will log in to secure server (318) with secret information, such as user name, passwords, one time codes, and/or biometric information (e.g. fingerprints). This user information step will help maintain security in the event that device (100) is attacked or falls into hostile hands.

As an additional level of security, at the user login stage, the secure server (102) may authorize the session (320), (322) with an additional server, such as an Authenex Strong Authentication System (ASAS) or equivalent. An ASAS server uses a similar type of two-factor authentication—something the user knows (a Personal Identification Number) and something the user has (in this case the hardware identification of device (100) to provide a level of authentication to supplement, verify, or potentially even replace credential server (104).

In either event, once the proper tokens are exchanged, the computerized device (100) and the secure web server (102) may now communicate using secure, encrypted, data (324).

FIG. 4 gives some additional details how this pocket mediated hardware-bond credential management system works. As per FIG. 2, a credential server (104), (204) will receive the information from secure web server (202) that secure server (102), (202) and user device (100), (200) wish to obtain cryptographic tokens to engage in secure communication. This information will usually be transmitted by link (220), be received by an appropriate software module (222), be verified by the credential server (224) and authorized by the database (304). Assuming that this cryptographic token exchange is authorized, a secure token handler (308) will generate an encryption token (306), and this will be relayed back though link (220) to secure web server (102), (202), which will then relay this token via link (214) to computerized device (100), (200). There the cryptographic token will be received by an appropriate software module (212), and sent by (302) to the customized pocket software module (208). There, the token will be used to encrypt and decrypt data (300) to suitable plug-ins or add-ons (206) in the user's internet browser.

Various methods may be used to communicate the secure token over the internet from the credential server to the secure server, and from the secure server to the computerized device. Since the token is essentially an encryption and decryption key, the token must be itself carefully encrypted. In general, any secure encryption method is suitable for the present invention. One way to do this is to again use Advanced Encryption Standard (AES) encryption. And encode the token so that s complex randomly generated puzzle must be solved by AES decryption before the token itself may be read.

Figure 5:
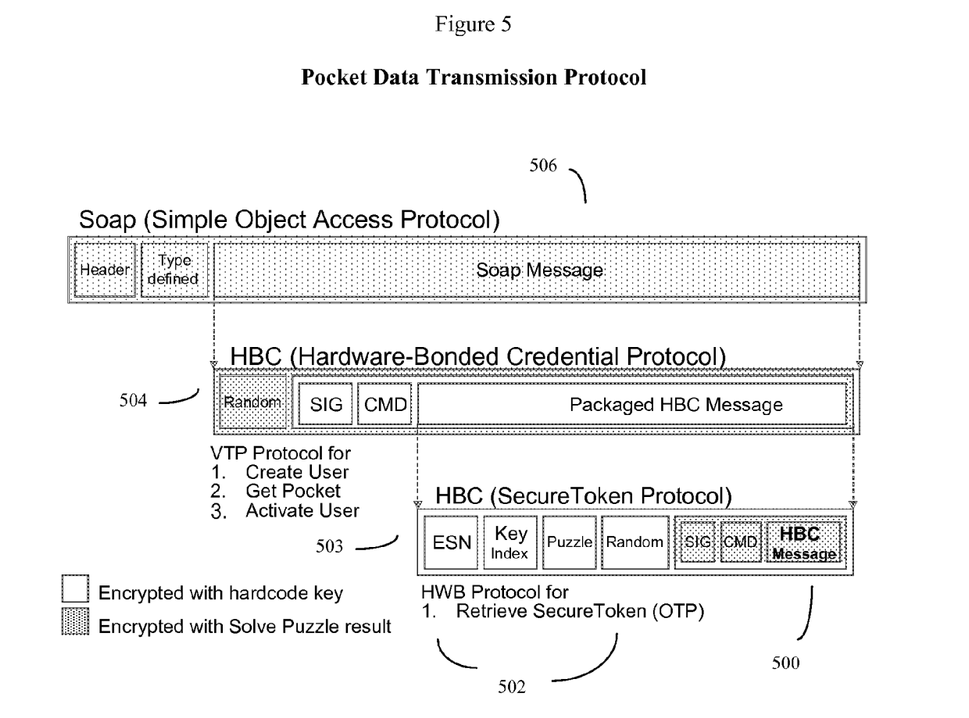
FIG. 5 shows an example of the data structures and transport protocols that may be used with this invention.

FIG. 5 shows an example of the data structures and transport protocols that may be used with this invention. As previously discussed, in some embodiments of the invention, it will be useful to use the standard Simple Object Access Protocol (SOAP) in order to allow the data to be easily transported through internet firewalls. To do this, the Hardware bonded credential message (500) (from the user device to the secure server) is encrypted, packaged with additional information that will allow an authorized recipient to interpret the message (502) forming a composite package (503). This in turn is packaged as part of a hardware-bonded credential (HBC) message (504), and this HBC message is in turn embedded as part of a standard SOAP message packet (506).

Figure 6:
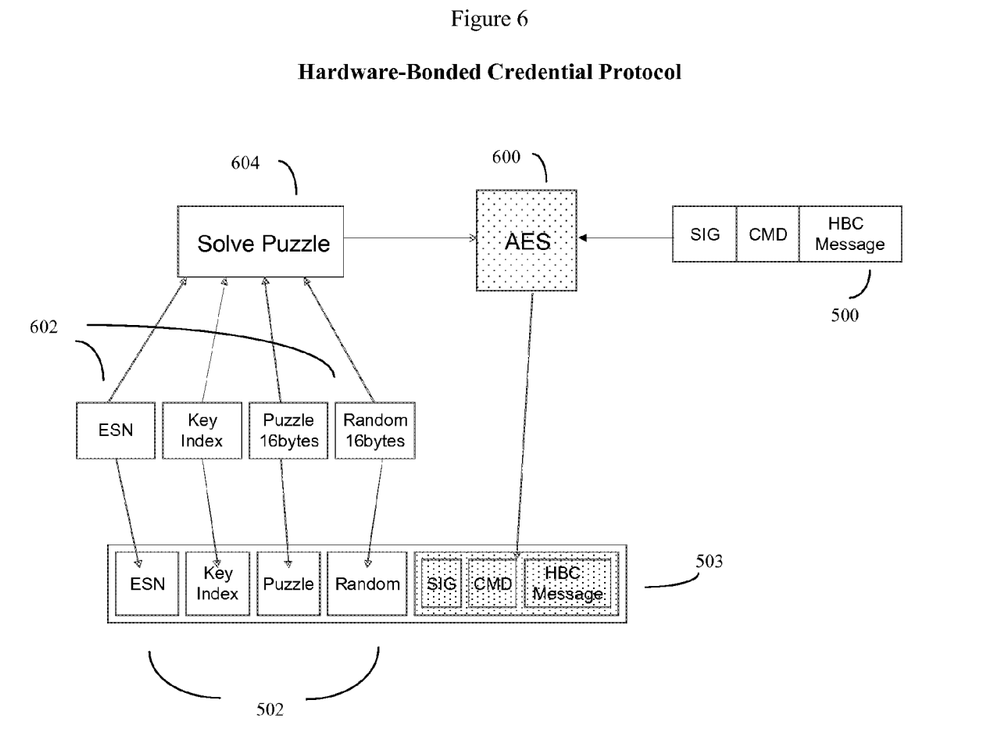
FIG. 6 shows an example of how hardware-bonded credentials are encoded and packaged.

FIG. 6 shows a detail of an encoding scheme that may be used to encode the HBC message (500) and additional information (502) into composite package (503). For enhanced security, The HBC message (500) may be encoded using the Advanced Encryption Standard (AES) encryption algorithm, (600). The additional information needed by the authorized recipient to interpret the message (502) is encoded by using electronic serial numbers (ESN), cryptography key indexes, and puzzle codes (602), and this puzzle challenge (604) is in turn used for the AES encoding process (600). The end result of this process is composite package (503).

Figure 7:
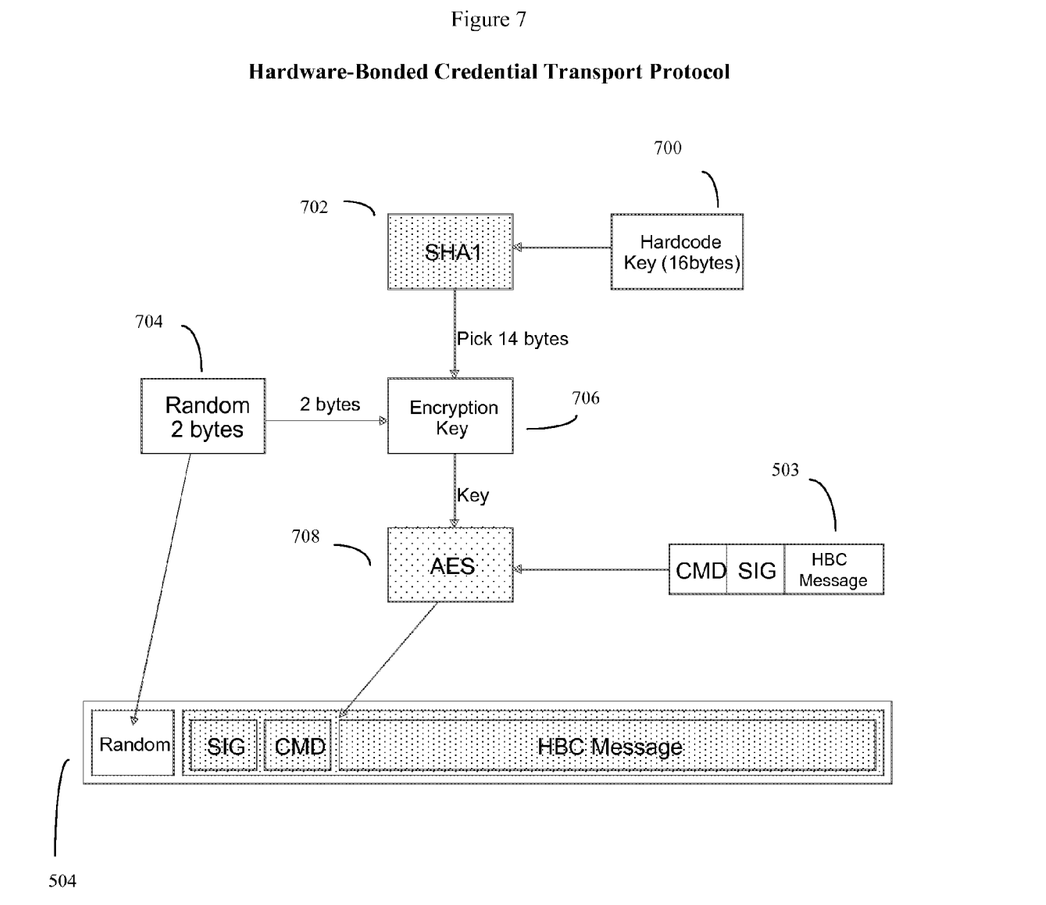
FIG. 7 shows an example of how hardware-bonded credentials are encoded and packaged.

FIG. 7 shows a detail of the encoding and encryption scheme that can be used to generate a data package (504). To do this, message (503) is encrypted by a complex scheme in which the Hardcode Key (700) is hashed into a 14 byte field using the Secure Hash Algorithm 1 (SHA1) method (702). This hashed hardware value, in conjunction with a random 2 byte field (704), is used to generate the AES encryption key (706) used by the AES encryption algorithm (708) to encrypt composite message (503). Other encryption and data packaging methods may also be used.

In some embodiments, the pocket can help to encrypt and decrypt messages by sending message data that contains a challenge part of the object (pocket) as one portion of the data, and in which other portions of the message data are encrypted in a manner that requires the response part of the object (pocket) for decryption. This pocket encrypted message data can also contain a secure signature field, such as a PGP signature, which when decrypted will provide yet another level of verification that the other side can be trusted.

As an example, if a user is dealing with a bank, after the pocket secure session has been established, the bank can transmit an official bank signature to the user to provide additional verification that the server site is a bank site.

The invention claimed is:

1. A method of providing secure network communication between a user with a networked computerized device, and a secure network server;
   in which said networked computerized device has a hardware identity, and said secure network server has a secret; comprising:
   transmitting said hardware identity to said secure network server;
   generating a challenge-response object (pocket) based on said hardware identity and said secret, and encrypting said pocket, thus generating an encrypted pocket;
   transmitting said encrypted pocket back to said networked computerized device;
   transmitting pocket decryption information (authorization) back to said networked computerized device by an out of band channel;
   and decrypting said pocket, thereby creating a challenge-response object that resides on both the secure networked server and the networked computerized device; and
   in which said networked computerized device and said secure network server then communicate securely by using said pocket to help encrypt and decrypt messages.

2. The method of claim 1, in which the secret is a random number stored or generated by the secure network server, and in which the pocket is generated by the secure network server.

3. The method of claim 1, in which the out of band channel uses oral communication, cellular telephone networks, wireless pager networks, and wired telephone networks, or one or more internet ports that are different from the internet ports used to communicate between said networked computerized device and said secure network server, and in which said different ports may include email ports.

4. The method of claim 1, in which said hardware identity is comprised of hardware component identification values that includes values selected from the group consisting of CPU ID values, internet Media Access Control (MAC) addresses, Ethernet Hardware (EHA) addresses, hardware type, and hardware capability.

5. The method of claim 4, in said user possesses user information and in which said hardware identity also contains this user information, and said user information is selected from the group consisting of user names, passwords, one time passwords (OTP), codes, and user biometric information selected from the group consisting of fingerprint information, face recognition information, or voice recognition information.

6. The method of claim 1, in which the encrypted pocket is decrypted using data obtained from both the out of band channel and the hardware identity.

7. The method of claim 1, which said pocket passed encryption and decryption of messages uses an encryption means selected from the group consisting of single key, secret key, symmetric encryption, public key, SSL protocols, Kerberos protocols, PKI protocols, RSA, PGP (pretty good privacy), SET (secure electronic transactions), DES (data encryption standard), or customized encryption protocols.

8. The method of claim 1, in which said pocket is used by a plug-in or add-on associated with an internet browser software residing on said networked computerized device.

9. The method of claim 1, in which said pocket is used by a stand along program on said networked computerized device, or in which said pocket is used by a component of a software program other than an internet browser on said networked computerized device.

10. The method of claim 1, in which the pocket helps to encrypt and decrypt messages by sending message data that contains a challenge part of the object (pocket) as one portion of the data, and in which other portions of the message data are encrypted in a manner that requires the response part of the object (pocket) for decryption.

11. The method of claim 1, in which said network computerized device obtains said pocket by establishing contact with said secure network server and requesting secure communication initialization software from said server;
   wherein upon receiving said secure communication initialization software, said network computerized device uses said secure communication initialization software to determine said hardware identity, or transmit said hardware identity to said server, or receive said pocket, or receive said pocket decryption information, or decrypt said pocket or use said pocket to communicate securely with said server.

12. The method of claim 1, in which the networked computerized device is connected to the internet, the secure network server is an internet web server, the user is running a web browser on said computerized device, and the computerized device communicates with the server using the http or https protocols and internet port 80 or internet port 443.

13. The method of claim 1 in which said secure network server has its authenticity guaranteed by a trusted networked credential server, further comprising:
   using said secure networked server to request said credential server send pocket decryption information back to said networked computerized device;
   wherein if said secure networked server is approved by said credential server, said credential server transmits pocket decryption information (authorization) back to said user or said networked computerized device by the out of band channel, and said authorization is subsequently used to decrypt said pocket.

14. A method of providing secure network communication between a user with a networked computerized device, and a secure network server;
   in which the networked computerized device is connected to the internet, the secure network server is an internet web server, the user is running a web browser on said computerized device;
   in which said networked computerized device has a hardware identity, said secure network server has a secret, and said server has its authenticity guaranteed by a trusted networked credential server; comprising:
   transmitting said hardware identity to said secure network server;
   generating a challenge-response object (pocket) based on said hardware identity and said secret, and encrypting said pocket, thus generating an encrypted pocket;
   transmitting said encrypted pocket back to said networked computerized device;

using said secure networked server to request said credential server send pocket decryption information back to said networked computerized device;

wherein if said secure networked server is approved by said credential server, said credential server transmits pocket decryption information (authorization) back to said user or said networked computerized device by an out of band channel and decrypting said pocket, thereby creating a challenge-response object that resides on both the secure networked server and the networked computerized device; and in which said networked computerized device and said secure network server then communicate securely by using said pocket to help encrypt and decrypt messages.

15. The method of claim 14, in which the secret is a random number with a length of 1024 bits or longer.

16. The method of claim 14, in which the pocket is generated by the secure network server.

17. The method of claim 14, in which said hardware identity is comprised of hardware component identification values that includes values selected from the group consisting of CPU ID values, internet Media Access Control (MAC) addresses, Ethernet Hardware (EHA) addresses, hardware type, and hardware capability.

18. The method of claim 17, in said user possesses user information and in which said hardware identity also contains this user information, and in which said user information is selected from the group consisting of user names, passwords, one time passwords (OTP), codes, and user biometric information selected from the group consisting of fingerprint information, face recognition information, or voice recognition information.

19. The method of claim 17, in which the encrypted pocket is decrypted using data obtained from both the out of band channel and the hardware identity.

20. The method of claim 14, which said pocket passed encryption and decryption of messages uses an encryption means selected from the group consisting of single key, secret key, symmetric encryption, public key, SSL protocols, Kerberos protocols, PKI protocols, RSA, PGP (pretty good privacy), SET (secure electronic transactions), DES (data encryption standard), or customized encryption protocols.

21. The method of claim 14, in which said pocket is used by a plug-in or add-on associated with an internet browser software residing on said networked computerized device.

22. The method of claim 14, in which said pocket is used by a stand along program on said networked computerized device, or in which said pocket is used by a component of a software program other than an internet browser on said networked computerized device.

23. The method of claim 14, in which the pocket helps to encrypt and decrypt messages by sending message data that contains a challenge part of the object (pocket) as one portion of the data, and in which other portions of the message data are encrypted in a manner that requires the response part of the object (pocket) for decryption.

24. The method of claim 14, in which said network computerized device obtains said pocket by establishing contact with said secure network server and requesting secure communication initialization software from said server;

wherein upon receiving said secure communication initialization software, said network computerized device uses said secure communication initialization software to determine said hardware identity, or transmit said hardware identity to said server, or receive said pocket, or receive said pocket decryption information, or decrypt said pocket or use said pocket to communicate securely with said server.

25. The method of claim 14, in which the computerized device communicates with the server using the http or https protocols and internet port 80 or internet port 443.

26. The method of claim 14, in which the authorization is sent directly from said credential server to said user or said computerized device by an out of band channel that utilizes oral communication, cellular telephone networks, wireless pager networks, and wired telephone networks.

27. The method of claim 14 in which authorization is sent directly from said credential server to said user or said computerized device by an out of band channel that uses one or more internet ports that are different from the internet ports used to communicate between said networked computerized device and said secure network server, and in which said different ports may include email ports.

28. The method of claim 14, in which the networked computerized device periodically checks with the credential server after authorization to verify that the secure network server is still authorized.

29. The method of claim 14, in which the secure network server and the credential server are the same server.

30. The method of claim 14, in which the secure network server and the credential server are different servers, and have different network addresses.

31. A method of providing secure internet communication between a user with an internet connected networked computerized device, and a secure internet server;

in which said secure internet server is a web server, and said user is running a web browser on said computerized device;

in which said user possesses user information, said computerized device has a hardware identity, the secure internet server has a secret, and said secure internet server has its authenticity guaranteed by a trusted internet credential server, comprising:

establishing contact with said secure internet server, requesting secure communication initialization software, and receiving said secure communication initialization software;

using said secure communication initialization software to transmit said hardware identity and user information to said secure network server;

generating a challenge-response object (pocket) based on said hardware identity, said user information, and said secret, and encrypting said pocket, thus generating an encrypted pocket;

transmitting said encrypted pocket back to said networked computerized device;

using said secure networked server to request said credential server to send pocket decryption information back to said networked computerized device;

wherein if said secure networked server is approved by said credential server, said credential server transmits pocket decryption information (authorization) back to said user or said networked computerized device by an out of band channel;

and decrypting said pocket using said authorization, hardware identity, and user information, thereby creating a challenge-response object (pocket) that resides on both the secure networked server and the networked computerized device; and in which said networked computerized device and said secure network server then communicate securely by using said pocket to help encrypt and decrypt messages.

32. The method of claim 31, in which the secret is a random number.

33. The method of claim 31, in which the pocket is generated by the secure network server.

34. The method of claim 31, in which said hardware identity is comprised of hardware component identification values that includes values selected from the group consisting of CPU ID values, internet Media Access Control (MAC) addresses, Ethernet Hardware (EHA) addresses, hardware type, and hardware capability.

35. The method of claim 31, in which said user information is selected from the group consisting of user names, passwords, one time passwords (OTP), codes, and user biometric information selected from the group consisting of fingerprint information, face recognition information, or voice recognition information.

36. The method of claim 31, in which the encrypted pocket is decrypted using data obtained both from the out of band channel and the hardware identity.

37. The method of claim 31, which said pocket passed encryption and decryption of messages uses an encryption means selected from the group consisting of single key, secret key, symmetric encryption, public key, SSL protocols, Kerberos protocols, PKI protocols, RSA, PGP (pretty good privacy), SET (secure electronic transactions), DES (data encryption standard), or customized encryption protocols.

38. The method of claim 31, in which said pocket is used by a plug-in or add-on associated with an internet browser software residing on said networked computerized device.

39. The method of claim 31, in which said pocket is used by a stand along program on said networked computerized device, or in which said pocket is used by a component of a software program other than an internet browser on said networked computerized device.

40. The method of claim 31, in which the pocket helps to encrypt and decrypt messages by sending message data that contains a challenge part of the object (pocket) as one portion of the data, and in which other portions of the message data are encrypted in a manner that requires the response part of the object (pocket) for decryption.

41. The method of claim 31, in which the computerized device communicates with the server using the http or https protocols and internet port 80 or internet port 443.

42. The method of claim 31, in which the authorization is sent directly from said credential server to said user or said computerized device by an out of band channel that utilizes oral communication, cellular telephone networks, wireless pager networks, and wired telephone networks.

43. The method of claim 31 in which authorization is sent directly from said credential server to said user or said computerized device by an out of band channel that uses one or more internet ports that are different from the internet ports used to communicate between said networked computerized device and said secure network server, and in which said different ports may include email ports.

44. The method of claim 31, in which the networked computerized device periodically checks with the credential server after authorization to verify that the secure network server is still authorized.

45. The method of claim 31, in which the secure network server and the credential server are the same server.

46. The method of claim 31, in which the secure network server and the credential server are different servers, and have different network addresses.

47. The method of claim 31, in which the user information is verified by an additional trusted authentication server (ASAS) different from said secure internet server and said credential server.

48. A method of providing secure network communication between a user with a networked computerized device, and a secure network server;
in which said user possesses user information, said networked computerized device has a hardware identity, and said secure network server has its authenticity guaranteed by a trusted networked credential server, comprising:
using said secure networked server to request said credential server to authorize and customize secure network server specific communications (pocket) software;
wherein if said secure networked server is approved by said credential server, said credential server sends notice of authorization of said pocket software directly to said user or said networked computerized device; and
said user or networked computerized device then sends said user information and said hardware identity to said secure server and/or said credential server;
said secure server and/or said credential server uses said user information and said hardware identity to customize said pocket software for said user information, hardware identity, and secure network server, and sends said customized pocket software back to said computerized device;
in which the customized pocket software, when activated, allows secure communication between said computerized device and said secure network server only if the same user information is provided, and said computerized device has the same hardware identity.

49. A method of providing secure internet communication between a user with an internet connected computerized device, and a secure internet server;
in which said internet connected computerized device communicates with said secure internet server using the http or https protocols and internet port 80 or internet port 443, said secure internet server is a web server, and said user is running a web browser on said computerized device;
in which said user possesses user information, said computerized device has a hardware identity, and said secure internet server has its authenticity guaranteed by a trusted internet credential server, comprising:
using said secure internet server to request said credential server to authorize and customize secure network server specific communications (pocket) software;
wherein if said secure internet server is approved by said credential server, said credential server sends notice of authorization of said pocket software directly to said user or said internet connected computerized device; and
said user or internet connected computerized device then sends said user information and said hardware identity to said secure server and/or said credential server;
said secure server and/or said credential server uses said user information and said hardware identity to customize said pocket software for said user information, hardware identity, and secure internet server, and sends said customized pocket software back to said computerized device;
in which the customized pocket software, when activated, allows secure communication between said computerized device and said secure internet server only if the same user information is provided, and said computerized device has the same hardware identity.

* * * * *